(12) United States Patent
Reilly et al.

(10) Patent No.: US 6,366,855 B1
(45) Date of Patent: Apr. 2, 2002

(54) TERRAIN NAVIGATION APPARATUS FOR A LEGGED ANIMAL TRAVERSING TERRAIN

(75) Inventors: Richard H. Reilly, Bracknell; John R Fountain, Liskeard, both of (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/600,485

(22) PCT Filed: Jun. 30, 2000

(86) PCT No.: PCT/GB00/02509

§ 371 Date: Jul. 18, 2000

§ 102(e) Date: Jul. 18, 2000

(87) PCT Pub. No.: WO01/06214

PCT Pub. Date: Jan. 25, 2001

(30) Foreign Application Priority Data

Jul. 15, 1999 (GB) .............................................. 9916482

(51) Int. Cl.[7] .................................................. G06G 7/78
(52) U.S. Cl. ........................ 701/213; 701/201; 701/205; 701/207; 701/210; 701/217; 340/988; 340/990; 340/995; 342/357
(58) Field of Search .......................... 702/150, 94, 141; 701/213, 207, 220, 221, 200; 340/573, 539, 693, 825.3, 825.31, 825.32; 600/595, 587, 27

(56) References Cited

U.S. PATENT DOCUMENTS

| 4,060,718 A | 11/1977 | Huddle .......................... 702/2 |
| 5,731,757 A | * 3/1998 | Layson, Jr. ................. 340/573 |
| 5,742,923 A | * 4/1998 | Odagawa ..................... 701/207 |
| 5,807,284 A | * 9/1998 | Foxlin .......................... 600/595 |
| 5,956,660 A | 9/1999 | Neumann .................... 702/150 |

FOREIGN PATENT DOCUMENTS

| DE | 198 30 150 | | 1/1999 |
| DE | 019830150 A1 | * | 1/1999 |
| EP | 0 389 318 A2 | | 9/1990 |
| FR | 2 670 004 | | 6/1992 |
| JP | 9-189564 | | 7/1997 |
| JP | 409243383 A | * | 9/1997 |
| WO | 95/25942 | | 9/1995 |
| WO | 98/17352 | | 4/1998 |

\* cited by examiner

Primary Examiner—William A. Cuchlinski, Jr.
Assistant Examiner—Tuan C To
(74) Attorney, Agent, or Firm—Nixon & Vanderhye P.C.

(57) ABSTRACT

Terrain navigation apparatus (1) for a legged animal (2) traversing terrain (3) including a first system (4) for determining position, velocity and heading of the legged animal incorporating sensing means for sensing inertial motion in six degrees of freedom operable to provide signals indicative of a first velocity (5a), a first heading (7a) and a first position (9a) of the legged animal (2), contact means (11) for establishing, in a velocity profile describing motion of either foot of the legged animal, a period where the velocity should be zero (17), which period corresponds to full or partial contact of the respective foot (13a, 13b) with surrounding terrain (3), and error-estimating means (15) for receiving as input signals the velocity profile during the period and for providing as output signals estimates of errors (19) associated with the sensing means output signals, which errors operatively interact with the output signals of the first system to effect terrain navigation of the legged animal (2).

21 Claims, 7 Drawing Sheets

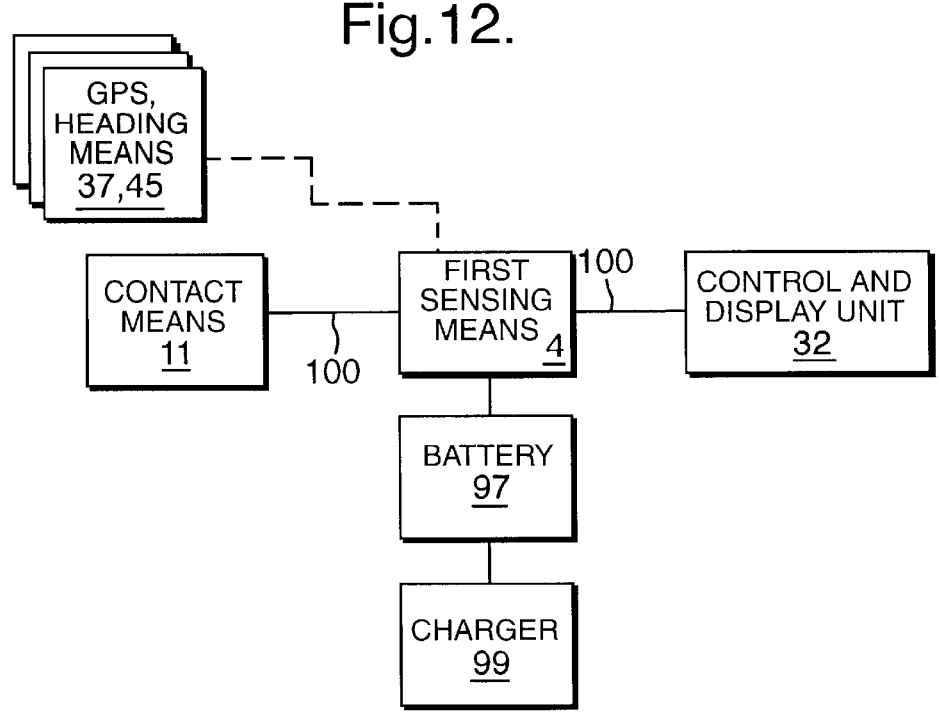
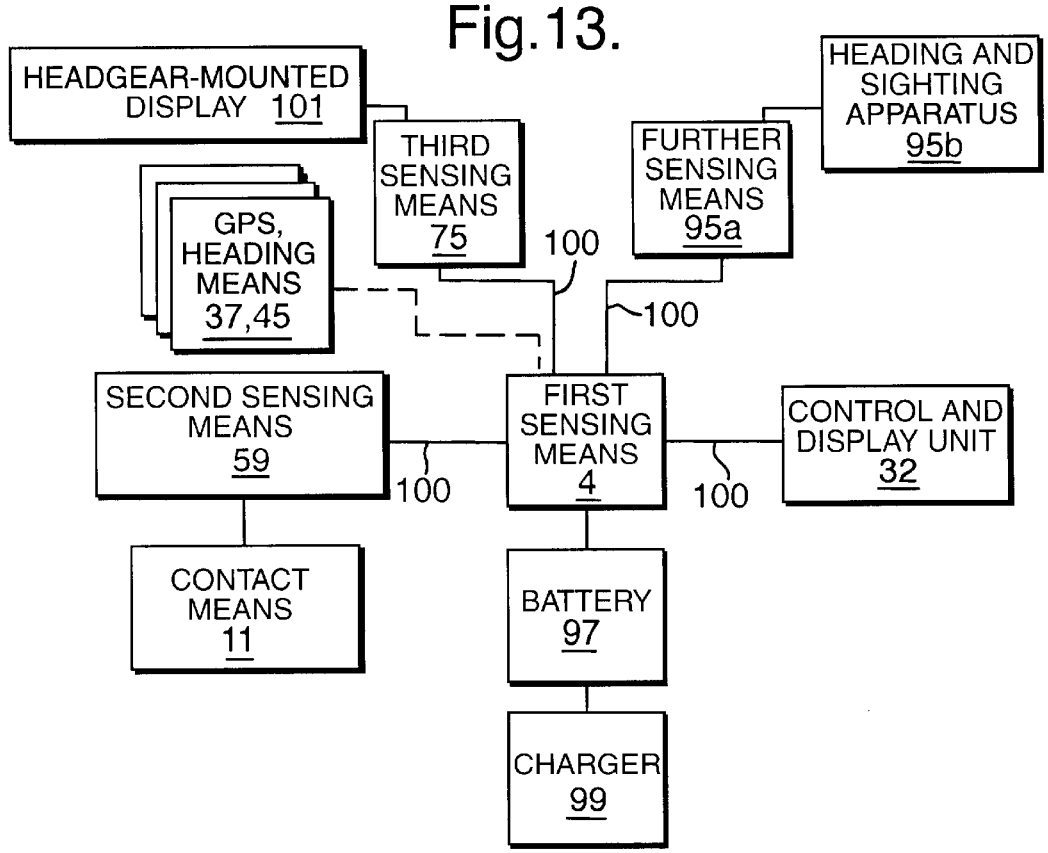

TERRAIN NAVIGATION APPARATUS FOR A LEGGED ANIMAL TRAVERSING TERRAIN

BACKGROUND OF THE INVENTION

1. Field of the Invention

This invention relates to terrain navigation apparatus for effecting terrain navigation of a legged animal traversing terrain.

2. Discussion of Prior Art

There are a number of navigation aiding sources currently in use in the open field or similar environments. These include magnetic heading, for deducing true heading; magnetic heading and pedometer, for performing dead-reckoning; magnetic heading for performing a running a fix on a landmark, thereby enabling computation of position; transit on two landmarks or on-top fix on landmark, which enables correction of position errors; GPS and JTIDS fix, for correcting position errors; barometric height update, for correcting height errors; and feature fix for correction of position and height, where knowledge of certain terrain features may be used for position and height updates, e.g. crossing a known section of straight road enables correction of position errors in a direction orthogonal to the road even though the crossing point is not fully defined, and crossing a known saddle point enables correction of height.

However, difficulties have arisen in difficult environments due to effects such as interference or jamming suppressing GPS, magnetic influences disturbing magnetic compasses, difficult or variable terrain leading to pedometer errors, and poor visibility affecting map-reading or sighting on landmarks. These problems are all characterised by discontinuities in available sensor or aiding information. These discontinuities can occur at critical times and are thus extremely undesirable.

Recent advances in Inertial Navigation Units (INU) have led to smaller and smaller units being produced. These may be based on Fibre Optic Gyroscope (FOG) technology, but they are still comparatively expensive. An INU may be integrated with some or all of the additional aiding sources described above, potentially enabling the above-mentioned gaps in data associated with the aiding sources to be bridged. However the drawback is partly the size of the FOG INU, and partly the cost. Recent advances in silicon gyro technology have led to gyros that can be produced on silicon production lines. This has the advantages of small size, mass production and low cost. However the gyro performance is at the low end for INU operation. These gyros, and similarly silicon accelerometers, provide the basis for a low performance INU, providing autonomous free-navigation that is only useful for very short periods of time.

There is therefore a need for a generally improved system for effecting terrain navigation in the open field that can make use of small size, low cost gyroscopes, in conjunction with a system performance enhancement that will give adequate performance over typical field operations and conditions.

SUMMARY OF THE INVENTION

According to a first aspect of the present invention there is provided terrain navigation apparatus for a legged animal traversing terrain including a first system for determining position, velocity and heading of the legged animal incorporating sensing means for sensing inertial motion in six degrees of freedom operable to provide signals indicative of a first velocity, a first heading and a first position of the legged animal, contact means for establishing, in a velocity profile describing motion of either foot of the legged animal, a period where the velocity should be zero, which period corresponds to full or partial contact of the respective foot with surrounding terrain, and error-estimating means for receiving as input signals the velocity profile during the period and for providing as output signals estimates of errors associated with the sensing means output signals, which errors operatively interact with the output signals of the first system to effect terrain navigation of the legged animal.

Preferably the legged animal is a human being.

Conveniently the sensing means include three mutually orthogonal specific force sensors and three mutually orthogonal angular rate sensors.

Advantageously the contact means is a matched filter arrangement.

Preferably the contact means is a pressure switch arrangement.

Conveniently the velocity profile is the first velocity output from the first system.

Advantageously the error-estimating means includes a Kalman Filter.

Preferably there is provided heading means for determining true heading of the legged animal, which heading means is in operative association with the first system.

Conveniently the heading means is a magnetic compass operable to output a magnetic heading.

Advantageously there is provided a satellite radio-navigation system, which satellite radio-navigation system is in operative association with the first system.

Preferably the satellite radio-navigation system is a Global Positioning System (GPS) operable to output a GPS position and a GPS velocity.

Conveniently the first system is locatable on a lower leg region of the legged animal.

Advantageously the first system is locatable on a foot of the legged animal.

Preferably there are two first systems, each locatable on a lower leg region of one leg of the legged animal.

Conveniently the first system is locatable at a lower back region of the legged animal.

Advantageously there is provided including a second system for determining position, velocity and heading of the legged animal incorporating sensing means for sensing inertial motion in six degrees of freedom operable to provide signals indicative of a second velocity, a second heading and a second position of the legged animal.

Preferably the second system is locatable on a lower leg region of the legged animal.

Conveniently the second system is locatable on a foot of the legged animal.

Advantageously there are two second systems, each locatable on a lower leg region of one leg of the legged animal.

Conveniently there is provided a position summation station for combining the first position and second position when the same have been corrected by the errors estimated by the error-estimating means, to provide a position difference, which position difference is thence received as input to the error-estimating means.

The present invention is suitable for use with any legged animal which moves across terrain by contacting the terrain by feet, hooves, skis or the like on its legs, such as a human being, and for convenience in the following description a legged animal will be referred to as a man.

BRIEF DESCRIPTION OF THE DRAWINGS

For a better understanding of the present invention, and to show how the same may be carried into effect, reference will now be made, by way of example, to the accompanying drawings, in which:

FIG. 12 is a block diagram functional split representation of hardware for FIGS. 2 to 8, and FIG. 13 is a block diagram functional split representation of hardware for FIGS. 9 and 11.

DETAILED DISCUSSION OF PREFERRED EMBODIMENTS

Apparatus of the invention for effecting terrain navigation as shown in FIGS. 1 to 13 is intended for use in situations where a legged animal, unaided by vehicular transportation means, is traversing terrain by foot, ski or hoof. The systems currently used to perform such tasks rely on instruments that are sensitive to external effects such as interference, magnetic influences and poor visibility, resulting in discontinuities in the system's performance which can have severe, and potentially life threatening, consequences.

Figure 1:
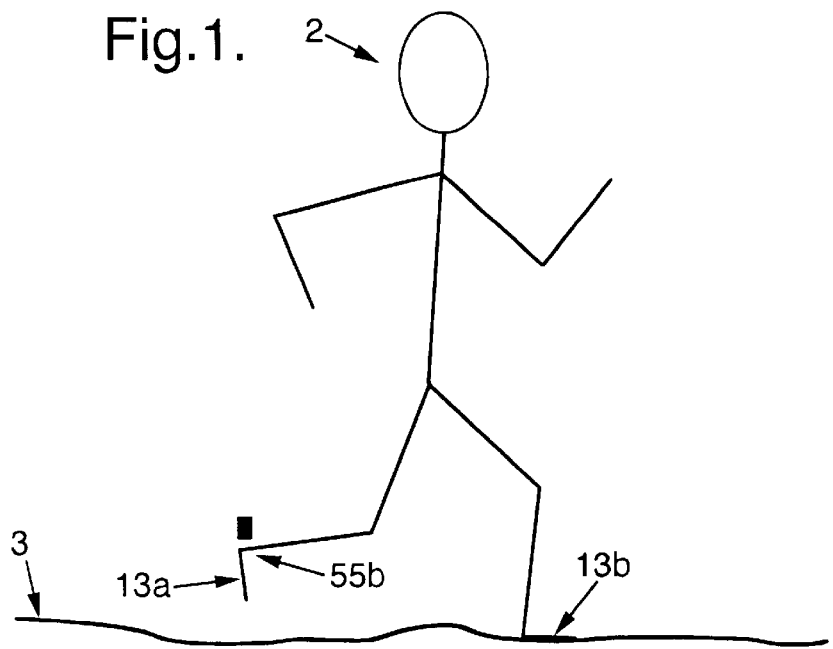
FIG. 1 is a schematic side view of a man traversing terrain on foot.
Figure 2:
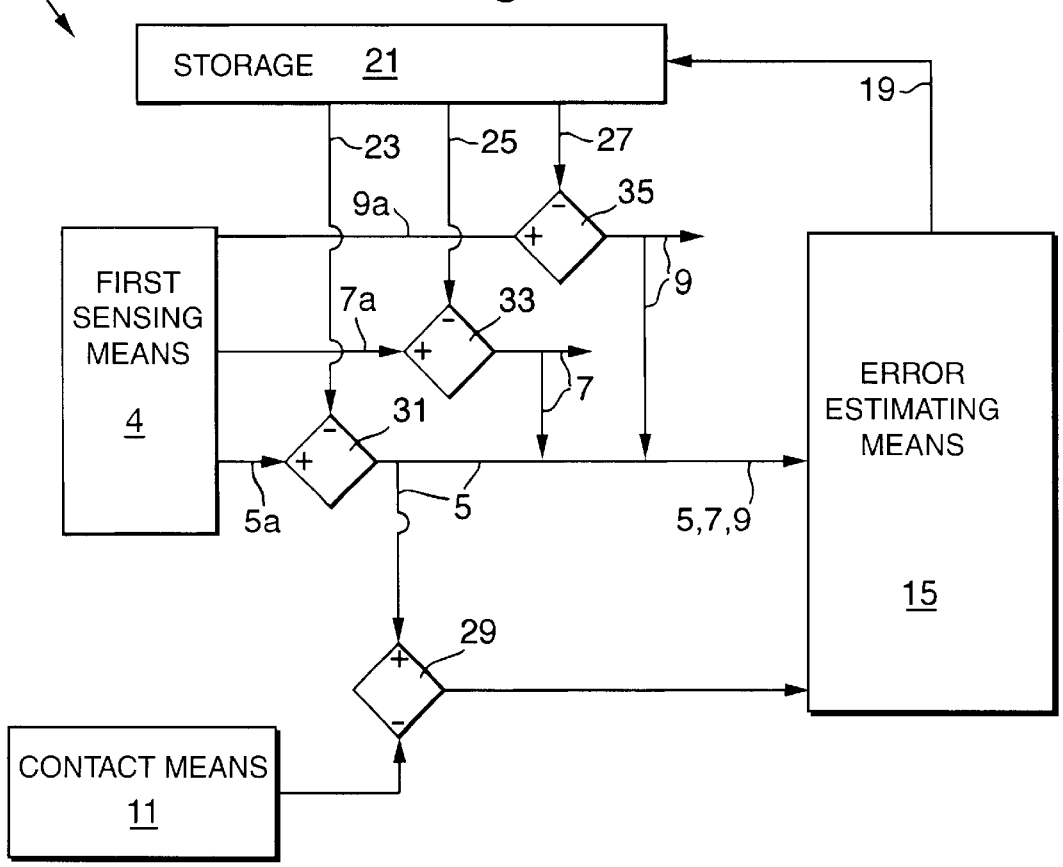
FIG. 2 is a block diagram illustrating apparatus according to a first embodiment of the present invention for carrying out the method of the present invention of effecting terrain navigation of the man shown in FIG. 1.
Figure 3:
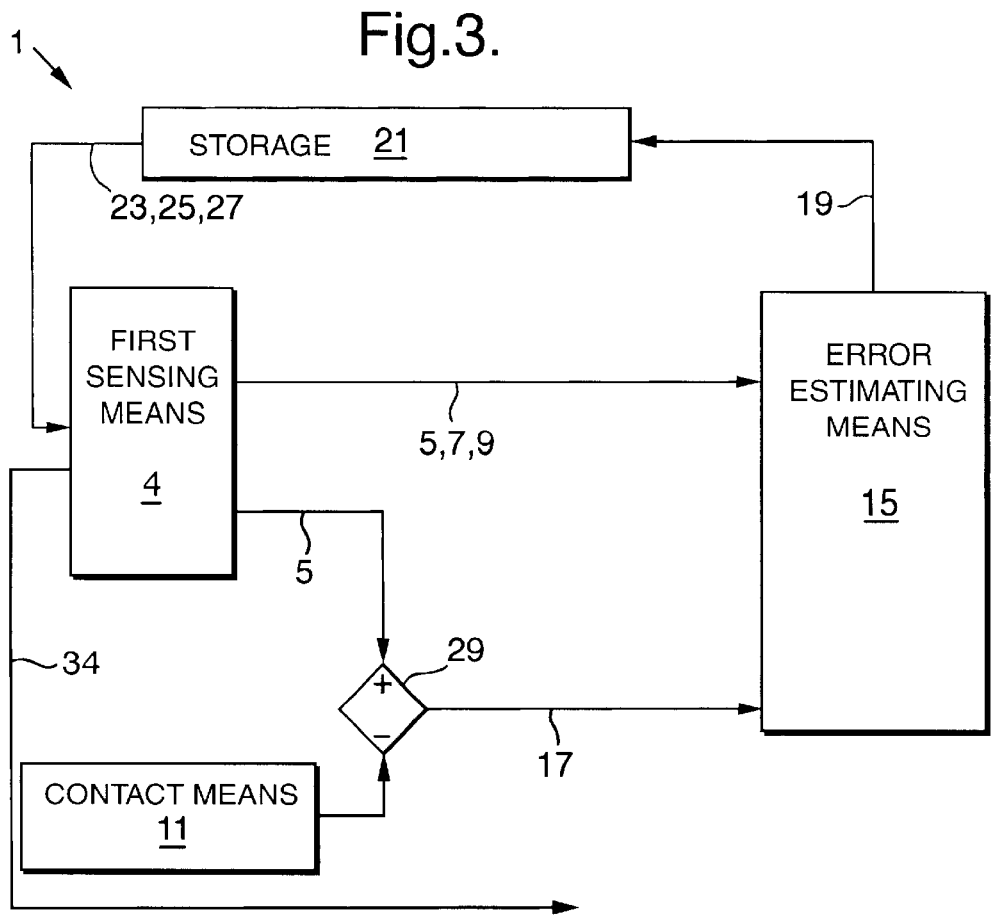
FIG. 3 is a representation of the block diagram of FIG. 2, not showing error-correcting apparatus.

Thus as shown in FIGS. 1, 2 and 3 of the accompanying drawings, terrain navigation apparatus 1 for a man 2 traversing terrain 3 according to a first embodiment of the present invention includes a first system 4 for determining position, velocity, and heading incorporating sensing means for sensing inertial motion in six degrees of freedom operable to provide signals indicative of a first velocity 5a, a first heading 7a and a first position 9a of the man 2, and contact means 11 for establishing, in a velocity profile describing motion of either foot 13a, 13b of the man 2, a period where the velocity should be zero 17, which period corresponds to full or partial contact of the respective foot 13a, 13b with surrounding terrain 3.

The apparatus also includes error-estimating means 15 for receiving as input signals the zero velocity period 17 and for providing as output signals estimates of errors 19 associated with the sensing means output signals 5a, 7a, 9a, which errors 19 operatively interact with the output signals 5a, 7a, 9a to effect terrain navigation of the man 2. FIGS. 2 and 3 both show the first embodiment of the invention, but FIG. 2 includes details of how the estimates of errors 19 may interact with the output signals 5a, 7a, 9a to provide corrected first velocity 5, corrected first heading 7 and corrected first position 9. The Figure shows a feed-forward configuration and it is to be understood that a feedback configuration, as shown in FIGS. 3, 6 to 9 and 11 where the errors are fed back to the first system 4, could be used as an alternative. In a feedback configuration the error estimates update the respective outputs of the first system 4, and the error estimates are reset to zero after each correction cycle. In a feed-forward configuration, however, the error estimates accumulate and are combined with the respective parameters of the first system 4, as opposed to updating the parameters. The latter configuration is shown in FIG. 2 where respective error estimates 23, 25, 27 are combined with the measured parameter at summation stations 31, 33, 35 to generate the corrected values. In FIG. 3 and subsequent Figures, these summation events are not shown, and the error estimates corresponding to the particular embodiment in question are instead input to the back of the respective system for determining position, velocity and heading, in a feedback configuration, described above. Correspondingly, the outputs from the respective system for determining position, velocity and heading are the corrected values, so that as shown in FIG. 3, the output from the first system 4 is corrected first velocity 5, corrected first heading 7 and corrected first position 9.

The first system 4 for determining position, velocity and heading is preferably a strapdown inertial navigation system comprising an inertial measurement unit (IMU) which may contain sensing means for sensing inertial motion in six degrees of freedom. This could be provided by six single axis sensing means, such as three mutually orthogonal specific force sensors and three mutually orthogonal angular rate sensors, or by suitable dual axis sensors. These sensing means are referred to as accelerometers and gyros in the following text.

The outputs 5, 7, 9 from the system 4 are shown in FIGS. 2, 3, 6 to 9 and 11 as direct inputs to the error-estimating means 15. These outputs always provide inputs to the error-estimating means 15 directly, irrespective of any additional manipulations, for example as input 5 to first summation station 29. In situations where input measurements, which in FIG. 3 is the velocity profile in the zero velocity period 17, to the error-estimating means 15 fails to satisfy thresholding conditions provided by a residual monitoring means known in the art, then the error estimating means 15 continues to estimate the errors 19 using inputs of corrected first position, velocity, and heading 5, 7, 9 alone. The error-estimating means 15 is preferably a Kalman filter, but could be any equivalent type of filter arrangement. The outputs 19 of the Kalman filter, stored at 21 in FIGS. 2, 3, 6 to 9 and 11 are then the best estimates of the errors, providing updates to the first system 4 via the stations described above when the system is operating in a feed-forward configuration. The first system 4 may provide inputs of attitude (inclination and bank) (not shown) to the error-estimating means 15 in addition to inputs of first position, velocity, and heading 5, 7, 9.

Figure 4:
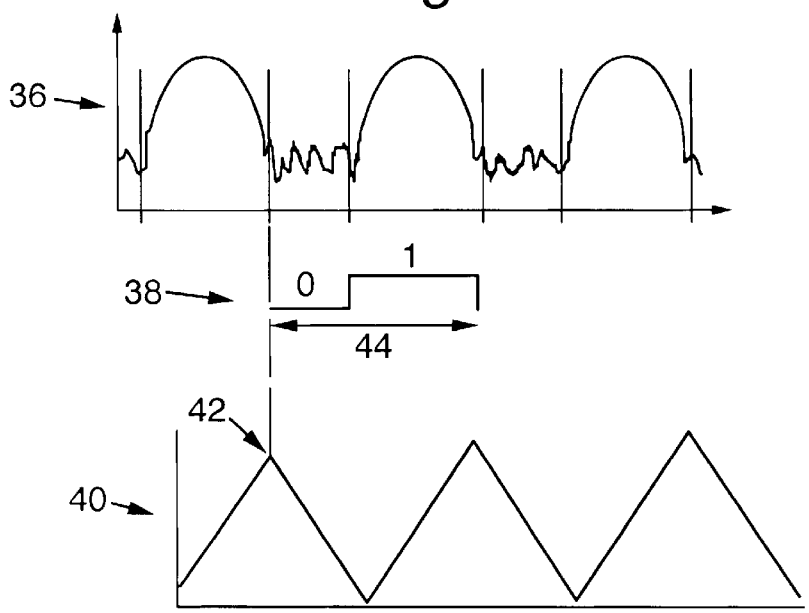
FIG. 4 is a graphical representation of the contact means forming part of the apparatus of FIG. 3.

The velocity profile describing motion of either foot 13a, 13b of the man 2, from which the velocity profile in the zero velocity period 17 is extracted, may be the corrected first velocity 5 output from the first system 4. The velocity profile may either be of horizontal or vertical velocity of the man 2, but is preferably the horizontal velocity. Horizontal velocity would be used for the 'horizontal channels', and vertical velocity for the 'vertical channel', affecting height and height rate only. When the zero velocity period 17 is extracted from the corrected first velocity 5, due allowance being made for discontinuities due to the correction 23, the contact means 11 for establishing the period where the velocity should be zero may be a matched filter arrangement. A typical corrected first horizontal velocity profile 36, when taken from the corrected first velocity 5, is shown in FIG. 4. The velocity 36 is shown offset from zero to represent any growth in velocity error that may have occurred, although this is expected to be minimal, <<1 m/s, since the velocity 5 has been corrected by its associated error estimate 23, as described above.

Figure 5:
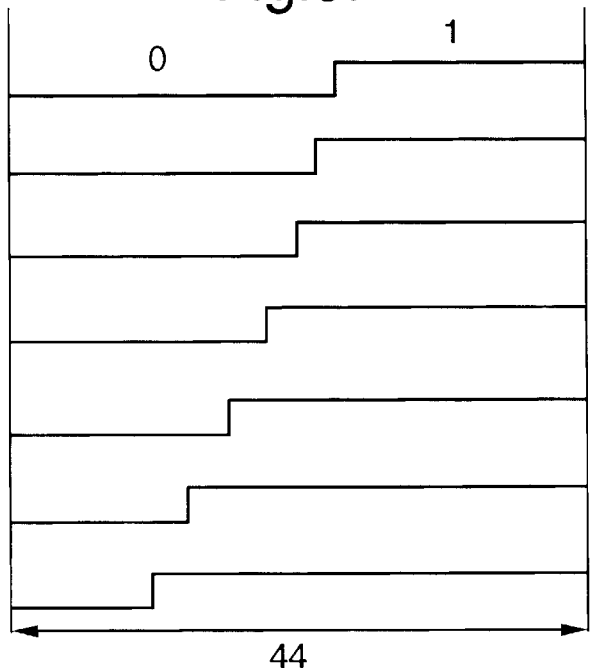
FIG. 5 is a graphical representation of various stride periods applicable to the contact means of FIG. 3.

The matched filter is known in the art for establishing when, or if, a waveform, whose characteristics are known in advance, occurs. One way of achieving this is illustrated in FIG. 4, where a reference waveform 38, similar to the velocity profile 36, is mixed therewith to generate a correlation function 40. The zero velocity period 17 can then be derived from the maxima 42 of the correlation function 40, which indicates where the zero velocity period 17 starts. The reference waveform 38 is representative of a stride period 44, with the 0 period representing the foot 13a, 13b on the ground 3, and the 1 representing the foot 13a, 13b in the air. This waveform is particularly suited to the application of walking and/or running, where the distribution of 0 and 1 periods will vary, as shown in FIG. 5, and this can easily be accounted for by adjusting the length of the periods as required. As the reference waveform 38 is initiated by the contact means 11, once the correlation function maxima 42 has been defined, station 29, which is in operative association with the contact means 11, can filter the corrected first velocity 5 to the error-estimating means 15 during the zero velocity periods 17.

For situations where the man 2 is not moving on the terrain 3, the matched filter will not be able to resolve the zero velocity period 17, as the velocity profile 36 is substantially flat. The corresponding autocorrelation will also be substantially flat, and this information can be used to distinguish stationary periods from periods of movement: an autocorrelation of the velocity profile 36 may performed simultaneously with the matched filter calculations, so as to flag periods when the man is moving.

As an alternative to the matched filter, the contact means 11 may be a pressure switch placed in the man's boot for sensing contact of the manes footwear with the ground. A signal from such a device could be directly coupled with the corrected first velocity 5 at station 29, so that the zero velocity period 17 is sent to the error-estimating means 15 during the periods of boot/ground contact.

In operation, the first system 4 would first require to gyrocompass to find north. This is possible while stationary, and may be possible with the zero velocity updates as a reference. However the horizontal component of Earth's rate at this latitude (50 degrees) is about 10 degree/hour. This implies the need for a gyro with a drift of no more than say 1 degree/hour to find north to 1/10th of a radian (crude, but this may be enough to initialise the system). Current Fibre Optic Gyros (FOG) do achieve 0.1 degree/hour, which makes this type of gyro a realistic means of finding north.

When the contact means 11 operates on the corrected first velocity 5, the first system 4 should be on the lower leg region 55b of the man, and preferably on either the foot (toe or heel region, say) or the ankle region so that the velocity profile 36 includes the zero velocity periods 17. Thus the first system 4 could be placed in the footwear of the man 2, on or in an ankle gaiter, or on or in the lower part of any legwear. As a redundancy measure, a first system 4 and ancillary equipment may be fitted to the lower leg region 55b of both legs.

The apparatus 1 communicates best estimates 34, shown in FIG. 3 only for clarity, of the corrected first position, first velocity, first heading together with corrected angular rates, linear accelerations and status information associated with the first system 4 to an external interface, which may be a control and display unit 32. Output 34 further includes uncertainties calculated by the error-estimating means 15, which provides a measure of the quality of this data in terms of position error covariances.

Figure 6:
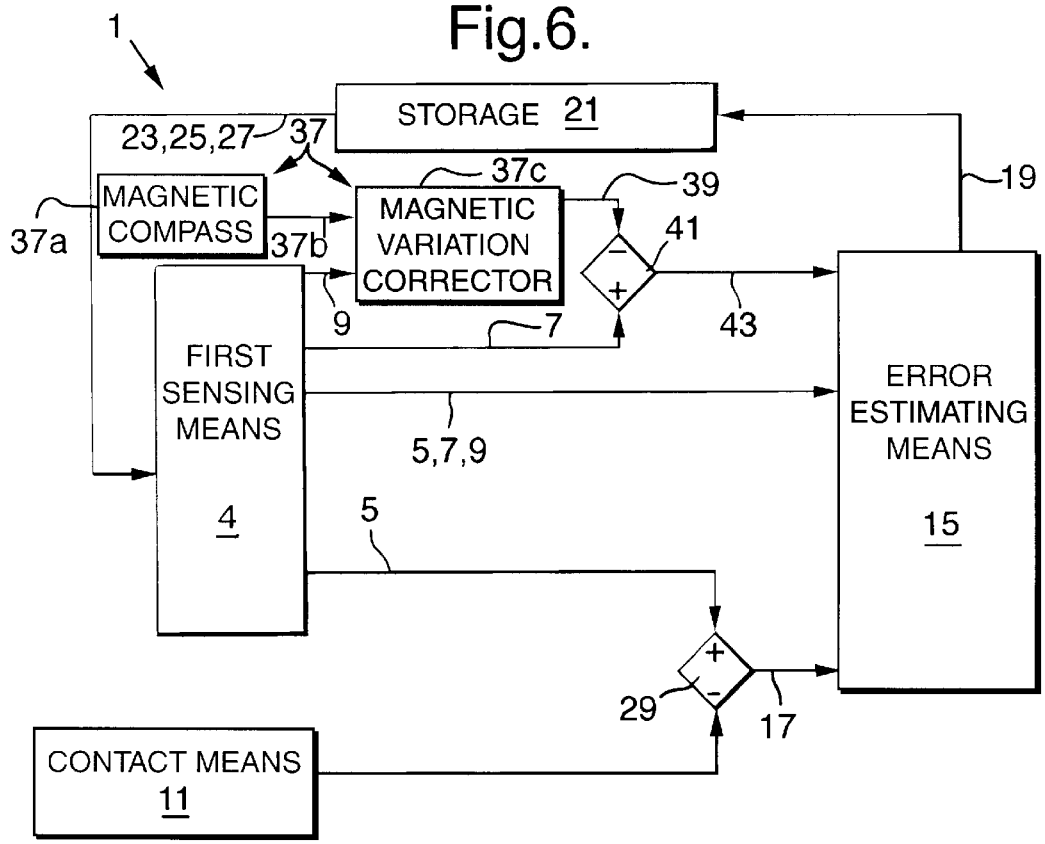
FIG. 6 is block diagram illustrating apparatus according to a second embodiment of the present invention for carrying out the method of the present invention of effecting terrain navigation of the man shown in FIG. 1, not showing error-correcting apparatus.

FIG. 6 of the accompanying drawings shows terrain navigation apparatus 1 for a man 2 according to a second embodiment of the present invention generally similar to that of FIGS. 1 to 5 in which like parts have been given like reference numerals and will not be described further in detail. This embodiment provides a heading means 37, in operative association with the apparatus of the first embodiment. The heading means 37 may comprise a magnetic compass 37a combined with the corrected first position 9 in a combining station 37c, for determining true heading of the man 39. This heading means 37 optionally provides a Magnetic North reference, which is corrected for magnetic variation at 37c, as a function of position on the Earth's surface. The heading means 37 may therefore provide an alternative method to gyro-compassing described above for initialising heading in the first system 4. The true heading reference 39 is differenced with the corrected first heading 7 from the first system 4 at station 41. The difference 43 is then input to the error-estimating means 15 to observe heading errors 25 in the first system 4, and generate corrections as described above. The heading means 37 needs to be rigidly mounted on the first system 4, to ensure a common heading.

Figure 7:
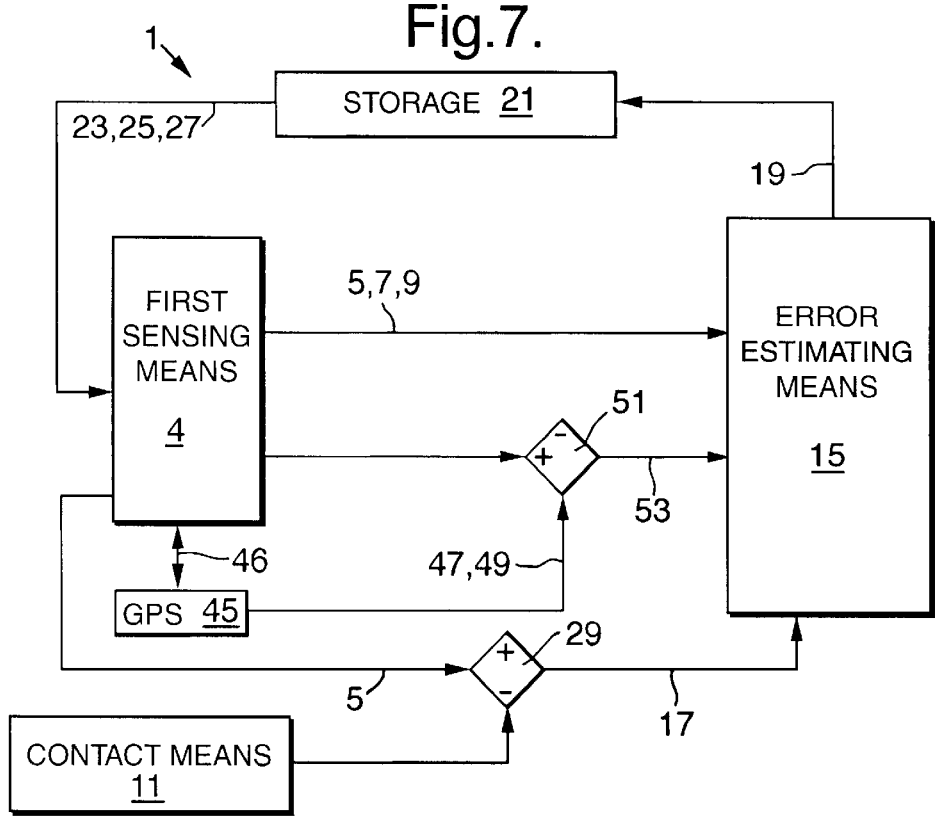
FIG. 7 is block diagram illustrating apparatus according to a third embodiment of the present invention for carrying out the method of the present invention of effecting terrain navigation of the man shown in FIG. 1, not showing error-correcting apparatus.

FIG. 7 of the accompanying drawings shows terrain navigation apparatus 1 for a man 2 according to a second embodiment of the present invention generally similar to that of FIGS. 1 to 5 in which like parts have been given like reference numerals and will not be described further in detail. This embodiment provides a satellite radio-navigation system 45 in operative association with the apparatus of the first embodiment. The satellite radio-navigation system 45 is preferably a Global Positioning System (GPS), for determining position and/or velocity of the man. As shown in FIG. 7, the GPS 45 outputs a GPS position 47, which is differenced with the corrected first position 9 from the first system 4 at station 51 to provide input 53 to the error-estimating means 15. The GPS 45 may also output a GPS velocity 49 to be differenced with the corrected first velocity 5 to provide a further input to the error-estimating means 15 (not shown). This provides more estimates of errors 19 and thereby helps constrain errors in the first system 4. The first system 4 provides aiding information to the GPS 45, which may take the form of heading, position and velocity data, 5, 7, 9, as indicated at 46 on FIG. 6. This aiding data results in synergy between the GPS 45 and the first system 4, enabling the GPS 45 to reject interference by narrowing its filter bandwidths.

Figure 8:
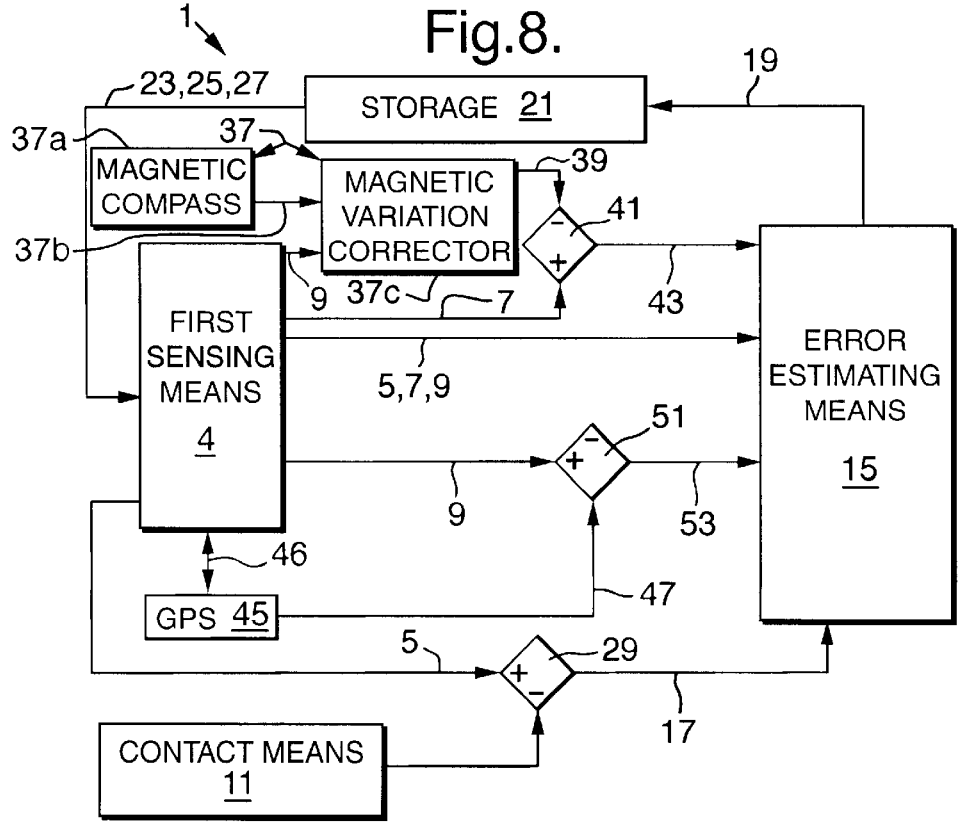
FIG. 8 is a block diagram illustrating apparatus according to a fourth embodiment of the present invention for carrying out the method of the present invention of effecting terrain navigation of the man shown in FIG. 1, not showing error-correcting apparatus.

FIG. 8 of the accompanying drawings shows terrain navigation apparatus for a man 2 according to a fourth embodiment of the present invention generally similar to that of FIGS. 1 to 7 in which like parts have been given like reference numerals and will not be described further in detail. This embodiment combines the apparatus of FIGS. 3, 6 and 7, and thus both the heading means 37 and the GPS 45 are in operative association with the apparatus of the first embodiment. Thus the apparatus 1 of this embodiment bases its performance on the both the optional aiding sources to the first system 4 (heading means 37 and GPS 45) and the zero velocity period 17 during foot 13*a*, 13*b* contact with the terrain 3. This enables the first system 4 to achieve better performance with lower quality inertial instruments (gyros and accelerometers).

The first embodiment of the present invention is independent of external aiding sources, and therefore relies entirely on the accuracy of the gyros and accelerometers comprising the sensors of the first system 4. The apparatus 1 is for use on the terrain 3 and the first system 4 may be positioned on the foot region of the man 2, where it will be subject to significant acceleration as the man 2 walks or runs. High specification gyros, such as may be required in the first embodiment, tend to be heavier and more expensive than the lower grade ones, and thus there may be a compromise between instrument performance, cost and weight. This embodiment allows use of lower grade sensors, thus reducing the weight of the apparatus carried in the foot region, to be used in the first system 4, because the measurements are aided by the additional inputs 37, 45, albeit with intermittence problems described above.

Figure 9:
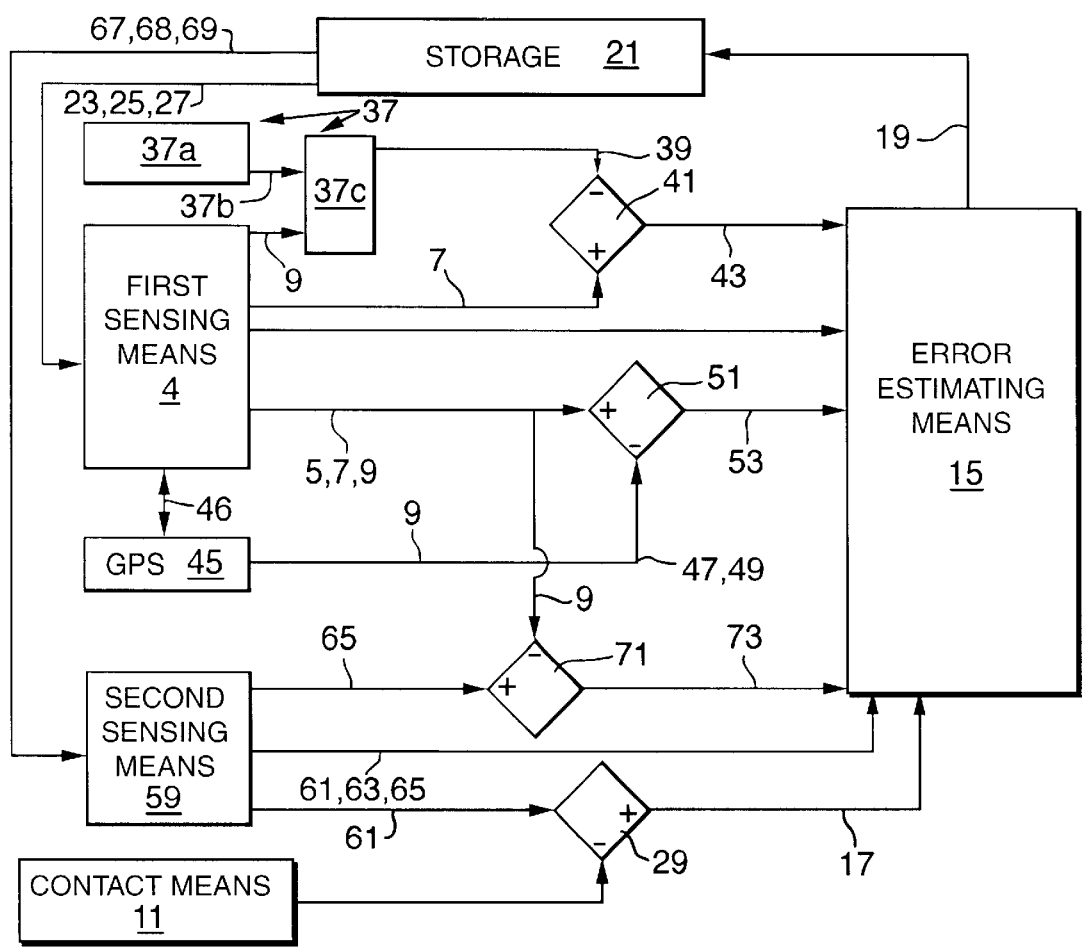
FIG. 9 is a block diagram illustrating apparatus according to a fifth embodiment of the present invention for carrying out the method of the present invention of effecting terrain navigation of the man shown in FIG. 1, not showing error-correcting apparatus.

FIG. 9 of the accompanying drawings shows terrain navigation apparatus 1 for a man 2 according to a fifth embodiment of the present invention generally similar to that of FIGS. 1 to 8 in which like parts have been given like reference numerals and will not be described further in detail. This embodiment takes the apparatus of the fourth embodiment, shown in FIG. 8, and adds a second system 59 for determining position, velocity and heading of the man incorporating sensing means for sensing inertial motion in six degrees of freedom operable to provide signals indicative of a second velocity, a second heading and a second position of the man, shown as corrected second velocity, heading and position 61, 63, 65 by virtue of error estimates 67, 68, 69. The second system 59 may additionally provide inputs of attitude (inclination and bank) (not shown) to the error-estimating means 15 in addition to inputs of second velocity, heading and position 61, 63, 65.

Figure 10:
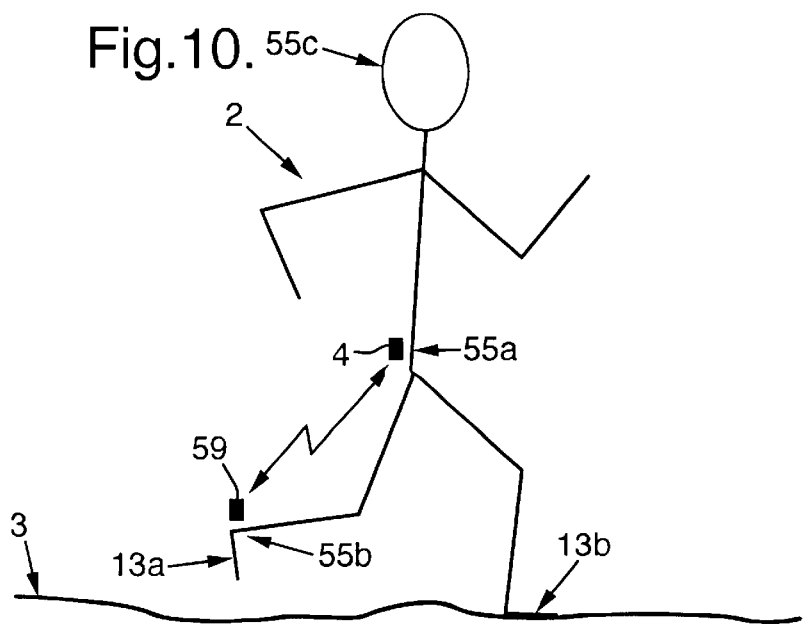
FIG. 10 is a schematic side view of a man traversing terrain on foot showing first and second systems of FIG. 9.

With this configuration, the first system 4 may be placed on or around the lower back or hip region 55*a* of the man, as shown in FIG. 10, and the second system 59 should be placed on the lower leg region 55*b*, such that the first and second systems 4, 59, are separated by approximately 1 m. As shown in FIG. 9, the corrected first position 9 and the corrected second position 65 are differenced at station 71, to observe the growth in position difference between these two systems via input 73 to the error-estimating means 15. The true position difference is known to be of the order of 1 m at all times, hence any divergence beyond this limit is due to the growth of position errors in the two systems 4, 59. The measured counterpart 73 is observed and used by the error-estimating means 15 to generate corrections to the two systems 4, 59 in the manner described above. The external aiding sources 37, 45 may therefore similarly be placed on or around the lower back or hip region 55*a* of the man, which reduces weight in the foot region of the man 13*a* 13*b*, now carrying the second system 59 only. This location, the lower back region 55*a*, provides a reasonably benign environment, and minimises exposure to physical damage. Due to the relatively low dynamics of the middle of the body, mass carried here imposes a minimum inertial load on the user.

In operation, the first system 4 may be coarse aligned using all available inputs 37, 45 to perform tasks such as gyro-compassing (described above) and leveling, the process of detecting the direction of the local acceleration due to gravity and aligning the first system 4 platform frame to this direction, of the apparatus 1. The latter may be performed using the GPS 45, or using a period of no motion. The second system 59 may then be coarse aligned using data from the first system 4. This should then be followed by a period of fine alignment in which the data from both systems 4, 59 may be integrated in a filter, such as the Kalman filter forming part of the error-estimating means 15. The interaction between the two systems 4, 59 and the accuracy thereof is largely controlled in the error-estimating means 15 by models of how measurements and the instrument characteristics providing the measurements vary over time, together with models of the coupling between the measurements and the characteristics.

The second system 59 defers to the first system 4 because the latter 4 has inputs from additional aiding sources 37, 45, from which a more accurate navigation solution may be estimated. The first system 4 may also be required to provide gyro-compassing, as described with reference to the first embodiment above, for which the sensors are likely to be of a higher grade than those where this function is not required (the second system 59). The function of the second system 59 is to provide the zero velocity period 17 input to the error-estimating means 15 and to constrain position errors 27, and low grade sensors are adequate to perform this task. The first system 4 therefore takes advantage of the zero velocity period 17 of the second system 59 together with the inputs from aiding sources 37, 45, and the fact that the position between the systems 4, 59 is known, typically of the order 1 m. The integration of the two systems 4, 59 thus cancels out their respective weaknesses and combines their strengths, resulting in terrain navigation apparatus 1 that operates under the constraints of walking, running, pausing, crawling or climbing. Clearly for situations where environmental conditions, such as weather and signal disturbance, occur, external data from aiding sources 37, 45 may not be possible. In these circumstances the zero velocity period 17 input would be the sole source of information updates.

Figure 11:
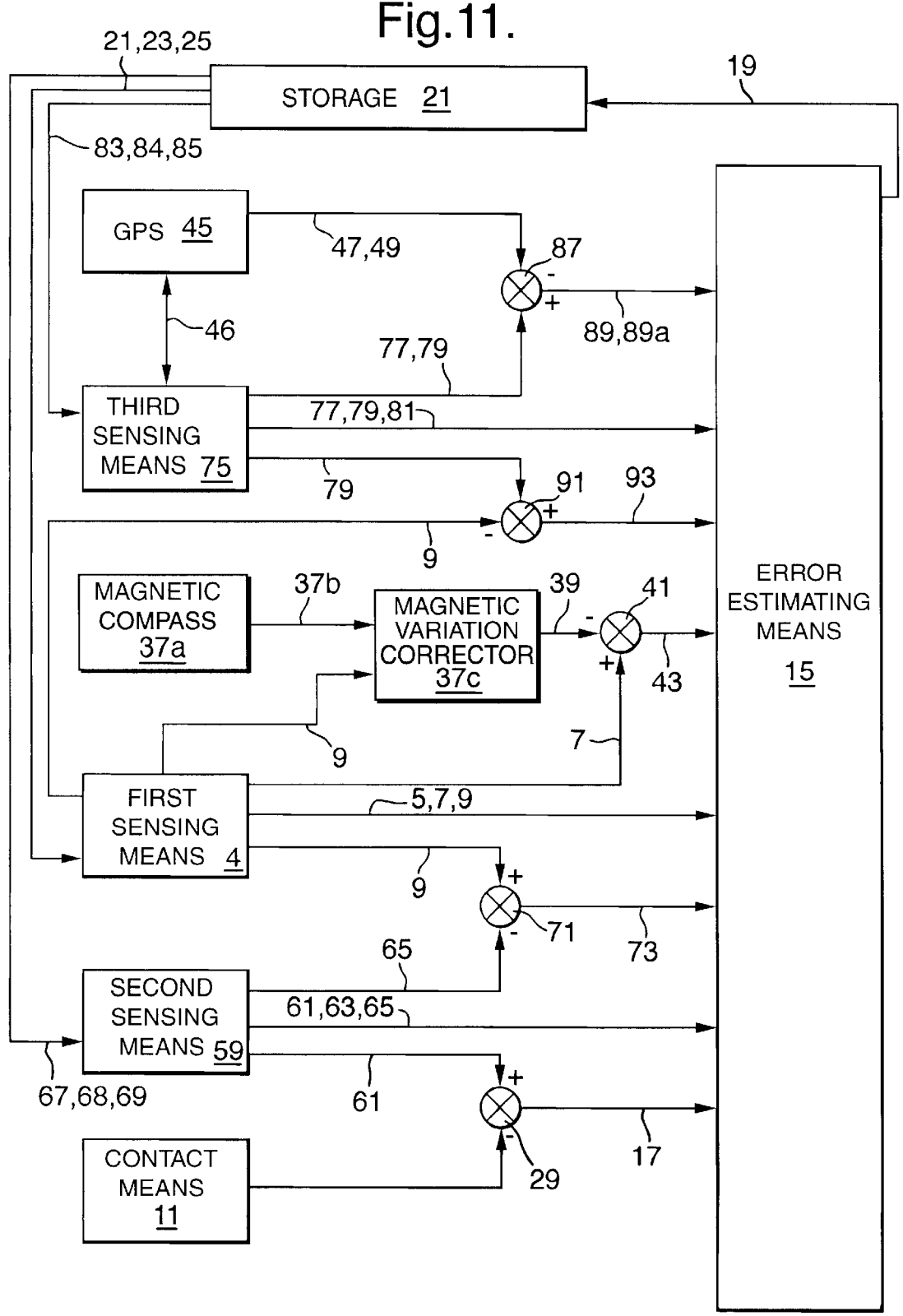
FIG. 11 is a block diagram illustrating apparatus according to a sixth embodiment of the present invention for carrying out the method of the present invention of effecting terrain navigation of the man shown in FIG. 1, not showing error-correcting apparatus.

FIG. 11 of the accompanying drawings shows terrain navigation apparatus 1 for a man 2 according to a sixth embodiment of the present invention generally similar to that of FIGS. 1 to 10 in which like parts have been given like reference numerals and will not be described further in detail. This embodiment takes the apparatus of the fifth embodiment, shown in FIG. 9, and includes a third system 75. The third system 75 is for determining position, velocity, heading and incorporates sensing means for sensing inertial motion in six degrees of freedom which are operable to provide signals indicative of a third velocity, a third heading and a third position, shown in FIG. 11 as corrected third velocity, position and heading 77, 79, 81 by virtue of error estimates 83, 84, 85. With this configuration, the first system 4 may be placed on or around the lower back or hip region 55a of the man, as shown in FIG. 10, the second system 59 should be placed on the lower leg region 55b, and the third system 75 may be placed on the head region of the man 55c, such that the first to second to third systems 4, 59, 75 are each separated by approximately 1 m. The corrected third velocity and position 77, 79 are differenced from GPS position and velocity 47, 49, if provided and available, at station 87 and the differences 89, 89a are input to the error-estimating means 15 to help generate corrections to the third system 75. The GPS 45, if available, may also be used to initialise the third system 75.

The corrected first position 9 and the corrected third position 79 may be differenced at 91, to observe the growth in position difference between these two systems via input 93 to the error-estimating means 15. As described above, the true position difference is known to be of the order of 1 m at all times, hence any divergence beyond this limit is due to the growth of position errors in the first and third systems 4, 75. This is observed and used by the error-estimating means 15 to help generate corrections to the systems 4, 75.

The third system 75 may additionally provide inputs of attitude (inclination and bank) (not shown) of the third system to the error-estimating means 15 in addition to inputs of third velocity, position and heading 77, 79, 81. When the GPS 45 is combined with the third system 75 outputs 77, 79, it is the third system 75 which provides aiding information to the GPS. This can be contrasted with the fifth embodiment, where the GPS 45 co-operates with the first system 4. The sharing of position information between first and second systems via respective corrected position outputs 9 and 65 and second and third systems via respective corrected position outputs 9 and 79 enables the overall system to base its performance on both the optional aiding sources to the first 4 and third 75 systems (GPS 45 and heading means 37) and the aiding source to the second system 11 (zero velocity period 17.) This enables the apparatus of this embodiment to achieve better performance with lower quality inertial instruments (gyros and accelerometers).

Additional components may be added to the apparatus 1, for example a sight or ranging means 95, shown schematically in FIG. 13, to measure orientation of the sight means 95, since this can obviously differ markedly from that of the body mounted first system 4. This enables sight data to be tagged with the orientation and position of the sight means 95, to provide intelligence to other personnel and systems. Furthermore, known objects such as landmarks can be observed and ranged with the sight means 95, and this data can be used to provide position updates to the first system 4. The sight means 95 would preferably include a further system 95a for determining further position, further velocity and further heading, and sighting apparatus 95b, such as a sight and laser ranger, and the further system position may be combined with the corrected first position 9 in a similar manner to that described in FIG. 11 for the corrected third position 79 of the sixth embodiment. Other outputs from the further system 95a, further velocity, heading, and optionally inclination and bank, may also be input to the error-estimating means 15.

The schematic functional split shown in FIG. 12 indicates the hardware required for the first, second, third and fourth embodiments of the present invention, and FIG. 13 shows the same for the fifth and sixth embodiments. At the centre of both Figures is the first system 4, which for the first four embodiments is located on the lower leg region of the man 2, and for the last two embodiments may best be located on the lower back region. There is also provided a battery pack or other source of electrical energy, for example a fuel cell, 97, which for all embodiments is probably best located on the lower back region of the body, as, because of the relatively low dynamics of the middle of the body, mass carried here imposes a minimum inertial load on the user. There may also be an optional hand-crank charger 99 to top up the battery 97 for sustained use of the apparatus 1 and for reducing a risk of loss of power due to incorrect or hurried preparation of the apparatus 1 prior to use. Each of the second and third systems 59, 75 is connected to the first system 4 by a Power/Data cable 100, thereby providing two-way communication and power distribution. When a pressure switch provides the contact means 11 to locate the zero velocity period 17, it is directly connected to whichever system is providing the corrected velocity output from which the zero velocity period 17 is extracted. For the first four embodiments this is the first system 4, as shown in FIG. 12, and for the fifth and sixth embodiments this is the second system 59, as shown in FIG. 13. The pressure switch is also powered by the respective system. The Control and Display Unit 32 is one way of providing a user interface by displaying data generated by the apparatus 1, as described with reference to the first embodiment above, and accepting commands and data input from the user.

The third system 75 may be directly connected to the first system 4 and may also interface to any headgear-mounted display 101, such as a visor display, to provide an alternative to the body mounted Control and Display Unit 32. It may also provide orientation information of the headgear to any headgear mounted surveillance system transmitting intelligence to other personnel or systems. In addition, incoming information, such as the position of a desired location, can be displayed on the headgear visor display, using the orientation data of the third system 75 to calculate the direction of the desired location with respect to the headgear display. Interfaces to aiding sources such as GPS 45 and heading means 37 may be provided by, for example, a 1553 or RS422 interface bus. Although data from these aiding sources are not available all the time, they help maintain an accurate overall navigation solution.

What is claimed is:

1. Terrain navigation apparatus for a legged animal traversing terrain including
   a first system for determining position, velocity and heading of the legged animal incorporating sensing means for sensing inertial motion in six degrees of freedom operable to provide signals indicative of a first velocity, a first heading and a first position of the legged animal,
   contact means for establishing, in a velocity profile describing motion of either foot of the legged animal, a period where the velocity should be zero, which period corresponds to full or partial contact of the respective foot with surrounding terrain, and
   error-estimating means for receiving as input signals the velocity profile during the period and for providing as output signals estimates of errors associated with the sensing means output signals, which errors operatively interact with the output signals of the first system to effect terrain navigation of the legged animal.

2. Apparatus according to claim 1, wherein the legged animal is a human being.

3. Apparatus according to claim 1, wherein the sensing means include three mutually orthogonal specific force sensors and three mutually orthogonal angular rate sensors.

4. Apparatus according to claim 1, wherein the contact means is a matched filter arrangement.

5. Apparatus according to claim 1, wherein the contact means is a pressure switch arrangement.

6. Apparatus according to claim 4, wherein the velocity profile is the first velocity output from the first system.

7. Apparatus according to claim 1, wherein the error-estimating means includes a Kalman Filter.

8. Apparatus according to claim 1, including heading means for determining true heading of the legged animal, which heading means is in operative association with the first system.

9. Apparatus according to claim 8, wherein the heading means is a magnetic compass operable to output a magnetic heading.

10. Apparatus according to claim 1, including a satellite radio-navigation system, which satellite radio-navigation system is in operative association with the first system.

11. Apparatus according to claim 10, wherein the satellite radio-navigation system is a Global Positioning System (GPS) operable to output a GPS position and a GPS velocity.

12. Apparatus according to claim 11, wherein the first system is locatable on a lower leg region of the legged animal.

13. Apparatus according to claim 12, wherein the first system is locatable on a foot of the legged animal.

14. Apparatus according to claim 11 having two first systems, each locatable on a lower leg region of one leg of the legged animal.

15. Apparatus according to claim 11, wherein the first system is locatable at a lower back region of the legged animal.

16. Apparatus according to claim 15, including a second system for determining position, velocity and heading of the legged animal incorporating sensing means for sensing inertial motion in six degrees of freedom operable to provide signals indicative of a second velocity, a second heading and a second position of the legged animal.

17. Apparatus according to claim 16, wherein the second system is locatable on a lower leg region of the legged animal.

18. Apparatus according to claim 17, wherein the second system is locatable on a foot of the legged animal.

19. Apparatus according to claim 16 having two second systems, each locatable on a lower leg region of one leg of the legged animal.

20. Apparatus according to claim 17, including a position summation station for combining the first position and second position when the same have been corrected by the errors estimated by the error-estimating means, to provide a position difference, which position difference is thence received as input to the error-estimating means.

21. Terrain navigation apparatus for a legged animal traversing terrain including an inertial measurement unit for determining position, velocity and heading of the legged animal by sensing inertial motion in six degrees of freedom operable to provide signals indicative of a first velocity, a first heading and a first position of the legged animal, a ground contact switch for establishing, in a velocity profile describing motion of either foot of the legged animal, a period where the velocity should be zero, which period corresponds to full or partial contact of the respective foot with surrounding terrain, and a Kalman filter error-estimator receiving as input signals the velocity profile during the period and for providing as output signals estimates of errors associated with the inertial measurement unit output signals, which errors operatively interact with the output signals of the inertial measurement unit to effect terrain navigation of the legged animal.

* * * * *